United States Patent Office 3,290,403
Patented Dec. 6, 1966

3,290,403
PROCESS FOR PREPARING DIENE HYDROCARBONS FROM 1,3 DIOXANES
Mark Semenovich Nemtsov and Revekka Vulfovna Kachalova, Leningrad, Nadezhda Vasiljevna Romanova, Efremov, Nadezhda Andreevna Kalinicheva and Fridrikh Shmerkovich Shenderovich, Leningrad, and Elena Jakovlevna Mandelshtam, Sergei Nickolaevich Arkharov, Vladimir Nazarovich Zlatkin, and Valery Jakovlevich Grinshpun, Moscow, all of U.S.S.R., assignors to Vsesouzny Nauchno-Isseldovatelsky Institute Sinteticheskogo Kauchooka "Lebedev," Ulitsa, U.S.S.R.
No Drawing. Filed Apr. 23, 1964, Ser. No. 362,168
4 Claims. (Cl. 260—681)

The present invention relates to the manufacture of diene hydrocarbons from olefins and aldehydes and, more particularly to an industrial method of catalytic cleavage of dimethyl-1,3-dioxanes to form corresponding dienes.

The process may be illustrated by the following equations:

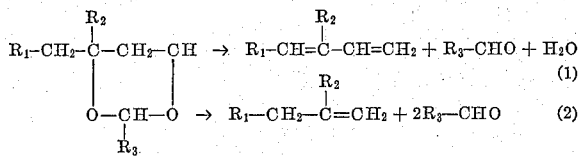

wherein $R_1$, $R_2$ and $R_3$ is hydrogen or a hydrocarbon radical.

Reaction 1 is the ultimate aim of the invention, whereas reaction 2 is the principal side conversion to form starting products, which are recycled to the first step of the synthesis.

Cleavage of 1,3-dioxanes by phosphatic catalysts and in particular calcium phosphates and calcium hydrogen phosphates is known in the art.

However, investigations carried out by us have shown that calcium hydrogen phosphates undergo irreversible conversions in the course of catalysis resulting in the loss of both activity and selectivity of the catalyst.

Phosphates, in particular tricalcium phosphate, are appreciably more stable under the conditions employed for the catalytic cleavage of 1,3-dioxanes, but exhibit low activity.

The principal object of this invention is to provide a process for preparing an active and selective catalyst with a sufficient service life.

Another object of the invention is to determine conditions for the catalytic cleavage of 1,3-dioxanes which make the process efficient and industrially feasible and provide for both uniform operation of the entire catalyst bed and the supply of required heat to the catalyst.

Other objects and advantages of the present invention will be apparent from the following detailed description of the process, which will be accompanied by appropriate examples and data.

Since the aforementioned phosphatic catalysts rapidly lose their activity in the process, we propose a basically novel method for the catalytic cleavage of 1,3-dioxanes, which involves the formation of catalytically active hydrogen phosphates in the course of the catalysis. Technically this is attained by the interaction between a phosphate heated in the reactor to a temperature of 300–400° C. and phosphoric acid vapor supplied (as a component of the reaction mixture) preferably in the amount of 0.002-0.060 percent by weight based on the steam.

For example, inexpensive and active catalysts for the cleavage of 1,3-dioxanes may be obtained on the basis of tricalcium phosphate and cadmium phosphate.

As starting materials not only cadmium or calcium phosphates can be used but also (mixtures thereof) with a small amount of the corresponding hydrogen phosphate (from 3 to 10 percent based on the phosphate used).

To provide for a higher efficiency of the catalyst, the said phosphating of the catalyst by phosphoric acid vapor should be carried out as uniformly as possible along the entire length of the catalysts bed.

A possible arrangement involves utilization of a sectionalized reactor, in which each section contains a definite quantity of the catalyst that complies with reaction kinetics.

Phosphoric acid is fed in preset quantities to each section of the reactor in a mixture with steam superheated to 700–800° C., the steam quantity being sufficient to compensate the negative thermal effect of the reaction.

EXAMPLE 1

When cleavage of 4,4-dimethyl-1,3dioxane (DMD) was carried out in the laboratory oven at 375° C. and DMD space velocity of 0.7 vol./vol. of catalyst-hr., the ratio of $H_2O$/DMD being 2:1 by weight, phosphatocalcium catalyst obtained by precipitation with disodium hydrogen phosphate from the solution of calcium chloride in the presence of ammonia and containing, according to chemical analysis, 30% of dicalcium phosphate and 70% of tricalcium phosphate, considerably lost its activity within 150 hours of operation. However, all other conditions being equal, the catalyst exhibited practically constant activity and selectivity for 1200 hours, when phosphoric acid vapor in the concentration of 0.006% based on the weight of steam was continuously fed to tricalcium phosphate in the course of the reaction.

EXAMPLE 2

With dimethyl-1,3-dioxane passed under identical conditions through commercial tricalcium phosphate, the degree of DMD cleavage equals 42–44 percent, the contents of isoprene is gaseous decomposition products being 81–83 percent and that of carbon deposit on the catalyst being 2.7–3.1 percent based on the weight of decomposed DMD.

After tricalcium phosphate had been phosphated for 10 hours by feeding to the catalyst the reaction mixture containing 0.006 percent of $H_3PO_4$ at 375° C., the degree of DMD cleavage under similar conditions amounted to 73 percent, the content of isoprene in the gas and the amount of carbon deposit on the catalyst being 90 and 2.6 percent respectively.

When the catalyst had worked for 40 hours under the above described conditions, the average degree of DMD cleavage amounted to 75 percent, the content of isoprene in the gas being as high as 98 percent and carbon deposit being reduced to one percent.

EXAMPLE 3

A precipitate mixture containing 97 percent of tricalcium phosphate and 3 percent of dicalcium phosphate was used as starting phosphate.

When a mixture of DMD and steam containing 0.006 percent of $H_3PO_4$ was passed through the aforementioned catalyst, the degree of DMD decomposition reached at once 90 to 95 percent, the content of isoprene in the gas being 94 percent and more.

EXAMPLE 4

A mixture of one part by weight of DMD and 2 parts by weight of steam, which contains 0.05 percent of $H_3PO_4$, was passed at a space velocity of 1 vol. DMD/vol. cat.-hr. and 325° C. over the catalyst composed of a precipitated mixture containing 85 percent of tricalcium phosphate, 10 percent of cadmium phosphate, and 5 percent of calcium and cadmium hydrogen phosphates. The degree of DMD cleavage amounted to 79 percent, the content of isoprene in the gas being 98 percent, and the yield of unsaturated alcohols, $C_5H_9OH$, 2.4 percent based on the decomposed DMD.

EXAMPLE 5

4-methyl-1,3-dioxane (MD) was passed over the catalyst, disclosed in Example 4, at 375° C. and a space velocity of 0.6 vol. MD/vol. cat.-hr., the ratio $H_2O/MD$ being 3:1 by weight.

The degree of MD cleavage was 72 percent whereas the content of divinyl in the gas and the yield of unsaturated alcohols, $C_4H_7OH$, was 97 and 5.7 percent respectively.

EXAMPLE 6

The condensation product of isobutylene and acetaldehyde, viz., 2,4,4,6-tetramethyl-1,3-dioxane(TMD), was passed over the catalyst, disclosed in Example 4, at 390° and a space velocity of 1 vol. TMD/vol. cat.-hr., the weight ratio of steam and TDM, $H_2O/TDM$, being 2:1.

The degree of TDM cleavage amounted to 85 percent, the content of methylpentadiene in gas being 86 percent.

EXAMPLE 7

DMD mixed with steam in the ratio, $H_2O/DMD$, 1:1 by weight was passed over a catalyst, containing 90 percent of tricalcium phosphate and 10 percent of dicalcium phosphate, for 1,100 hours at 380° C.; phosphoric acid in the amount of 0.003 percent based on steam weight was continuously fed to the catalyst during both catalytic reaction and periodic oxidative regeneration. The average degree of DMD cleavage amounted to 90 percent with DMD space velocity of 0.7 vol. DMD/vol. cat.-hr., the content of isoprene in the gas being 92 percent and more.

EXAMPLE 8

Phosphoric acid taken in the amount of 0.06 percent based on the weight of steam was passed for 10 hours over the catalyst, disclosed in Example 7, when the activity of the catalyst owing to insufficient supply of $H_3PO_4$ during previous 200 hours of operation was reduced and the degree of DMD cleavage fell to 50 percent. This treatment resulted in raising the degree of DMD cleavage to 75 percent, and on further treatment with $H_3PO_4$ in a concentration of 0.01 percent, DMD cleavage rose as high as 85 percent, the content of isoprene in the gas being 90 to 93 percent in all instances.

EXAMPLE 9

Commercial tricalcium phosphate in tablets (dicalcium phosphate content 3 percent) was charged into a 6-section experimental reactor. The percentage of the catalyst in various sections of the reactor was as follows:

| No. of Section | I | II | III | IV | V | VI |
|---|---|---|---|---|---|---|
| Amount of catalyst, percent | 10 | 12 | 15 | 18 | 21 | 24 |

The rate of DMD feed amounts to 1.0 kg. per one liter of the catalyst per hour. Simultaneously with the DMD, steam is supplied to the first section of the reactor at a rate of 1 kg. $H_2O/1$ of cat.-hr., whilst to all other sections of the reactor superheated steam at 750° C. is fed in approximately equal quantities totalling 1.2 kg. $H_2O/1$ cat.-hr.

The amounts of superheated steam fed to each reactor section is automatically controlled through the use of temperature transducers incorporated at a reaction mixture outlet in each steam mixer; the control system is adjusted so as to maintain the temperature at the inlet of all sections at 380° C.

Simultaneously to all sections a solution of orthophosphoric acid is supplied, said solution being fed per hour in quantities amounting to approximately 0.01 percent of $H_3PO_4$ based on the weight of the catalyst in a particular section. The acid solution is introduced into special evaporation chambers together with superheated steam, which provides for instantaneous and complete evaporation of the acid.

After a contact time of 4 hours, the catalyst is subjected for 2 hours to oxidative regeneration by an air-steam mixture.

At the reactor outlet the degree of dimethyl-dioxane cleavage is as high as 90 to 95 percent, the yield of isoprene being 85 percent based on the decomposed DMD. The principal by-product is isobutylene (yield 6 to 10 percent) recycled for the synthesis of dioxane.

EXAMPLE 10

By way of illustrating the phosphating of tricalcium phosphate in a tubular and a sectionalized reactor experimental data on the chemical composition of the catalysts discharged from the reactor after prolonged operation are given in Table 1.

*Table 1*

CHEMICAL COMPOSITION OF SPENT CATALYST BEDS IN TUBULAR AND SECTIONALIZED REACTORS

| Type of reactor | Catalyst bed or reactor section | Content, weight percent | | Molar ratio $CaO/P_2O_5$ | Quantity of 4,4-dimethyl-dioxane fed at a rate of 1.3 kg./m.³-hr. (DMD cleavage 90%) |
|---|---|---|---|---|---|
| | | CaO | $P_2O_5$ | | |
| Tubular reactor (experimental-industrial) | Head bed (the first third) | 42.67 | 52.30 | 2.07 | |
| Do | Medium bed (the second third) | 48.23 | 45.92 | 2.67 | 650 |
| Do | Exit bed (the last third) | 50.74 | 43.67 | 2.95 | |
| Sectionalized reactor (experimental-industrial) | Section I | 47.79 | 45.33 | 2.67 | |
| | Section II | 49.71 | 46.12 | 2.73 | |
| | Section III | 50.07 | 46.57 | 2.73 | |
| | Section IV | 49.23 | 45.35 | 2.75 | 1,400 |
| | Section V | 49.61 | 44.74 | 2.81 | |
| | Section VI | 49.95 | 45.37 | 2.79 | |

From data presented in the table it follows that the molar ratio $CaO/P_2O_5$ in the tubular reactor increases with the distance from the reaction mixture inlet.

When the process is carried out in the sectionalised reactor, the ratio $CaO/P_2O_5$ remains practically constant through the entire height of the catalyst bed.

Therefore, the degree of phosphating of the entire tricalcium phosphate charged into the reactor has proved to be sufficiently uniform with sectional supply of phosphoric acid to the catalyst in the sectionalized reactor.

Accordingly, the unit efficiency of the catalyst in the sectionalized reactor has proved to be twice as great as in the tubular reactor.

We claim:

1. A process of preparing diene hydrocarbons from 1,3-dioxanes which comprises simultaneously passing dioxane vapor and superheated steam, containing 0.002–0.060 percent of phosphoric acid, through phosphates heated to 300–400° C. and selected from the group consisting of calcium and cadmium phosphates and mixtures thereof, wherein the phosphoric acid on interaction with said phosphates yields a catalytically active acid phase.

2. A process of preparing diene hydrocarbons from 1,3-dioxanes, which comprises simultaneously passing dioxane vapor and superheated steam, containing 0.002–0.060% of phosphoric acid through a phosphate mixture heated to a temperature of 300–400° C. and consisting essentially of mixtures of phosphates with 3–10 percent of hydrogen phosphates selected from the group consisting of calcium and calcium hydrogen phosphates, cadmium and cadmium hydrogen phosphates, and calcium and cadmium phosphates in a mixture with hydrogen phosphates thereof, wherein the phosphoric acid continuously forms an active acid phase on interaction with the phosphates.

3. A process of preparing diene hydrocarbons from 1,3-dioxane, which comprises passing a mixture of dioxane vapor, and steam through a multi-sectional reactor with sections charged with phosphates selected from the group consisting of calcium and cadmium phosphates and mixtures thereof, superheated steam being supplied differentially to each separate section to maintain preset temperature conditions in each said section and phosphoric acid vapor being also supplied differentially in admixture with the superheated steam so as to control the desired amount of an active, catalytic phase in each section through the interaction between the phosphoric acid and said phosphates.

4. A process of preparing diene hydrocarbons from 1,3-dioxane which comprises passing a mixture of dioxane vapor and steam through a multi-sectional reactor with sections charged with mixtures of phosphates containing 3 to 10 percent of hydrogen phosphates and selected from the group consisting of calcium and cadmium phosphates, hydrogen calcium and cadmium phosphates, calcium and cadmium phosphates in a mixture with hydrogen phosphates thereof, superheated steam being supplied differentially into each separate section to maintain preset temperature conditions in the sections and phosphoric acid vapor being also differentially supplied in admixture with the superheated steam so as to control the desired amount of an active catalytic phase in each section through the interaction between the phosphoric acid and said phosphates.

References Cited by the Examiner

Gershkovich et al.: "Chem. Abst.," 58, 13769e, (1963).

DELBERT E. GANTZ, *Primary Examiner.*

G. E. SCHMITKONS, *Assistant Examiner.*